US006593757B2

(12) United States Patent
Nakayama et al.

(10) Patent No.: US 6,593,757 B2
(45) Date of Patent: Jul. 15, 2003

(54) CAPACITANCE TYPE DISPLACEMENT DETECTION APPARATUS

(75) Inventors: Kenichi Nakayama, Kawasaki (JP); Toshihiro Hasegawa, Kawasaki (JP); Atsushi Tominaga, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/291,630

(22) Filed: Nov. 12, 2002

(65) Prior Publication Data
US 2003/0067309 A1 Apr. 10, 2003

Related U.S. Application Data

(63) Continuation of application No. 09/727,700, filed on Dec. 4, 2000, now abandoned.

(30) Foreign Application Priority Data

Dec. 2, 1999 (JP) ............................................. 11-343860
Dec. 9, 1999 (JP) ............................................. 11-350020

(51) Int. Cl.$^7$ ............................................... G01R 27/26
(52) U.S. Cl. ...................... 324/686; 324/662; 324/660; 324/690; 324/725; 340/870.3
(58) Field of Search ................................ 324/686, 662, 324/660, 725, 690, 671, 658

(56) References Cited

U.S. PATENT DOCUMENTS

| 4,429,307 A | * | 1/1984 | Fortescue | 340/870.3 |
|---|---|---|---|---|
| 4,449,179 A | | 5/1984 | Meyer | 324/725 |
| 4,543,526 A | | 9/1985 | Burckhardt et al. | 324/725 |
| 4,743,902 A | | 5/1988 | Andermo | 324/660 |
| 4,841,225 A | | 6/1989 | Meyer | 324/660 |
| 4,878,013 A | | 10/1989 | Andermo | 324/690 |
| 4,882,536 A | | 11/1989 | Meyer | 324/671 |
| 4,893,071 A | | 1/1990 | Miller | 324/660 |
| 4,959,615 A | | 9/1990 | Andermo | 324/690 |
| 5,049,824 A | | 9/1991 | Suzuki et al. | 324/660 |
| 5,053,715 A | | 10/1991 | Andermo | 324/662 |
| 5,068,653 A | | 11/1991 | Klingler et al. | 340/870.3 |
| 5,225,830 A | | 7/1993 | Andermo et al. | 341/13 |
| 5,394,096 A | | 2/1995 | Meyer | 324/686 |
| 5,461,320 A | | 10/1995 | Strack et al. | 324/662 |
| 5,534,859 A | | 7/1996 | Meyer | 340/870.3 |
| 5,731,707 A | | 3/1998 | Andermo | 324/660 |
| 5,896,032 A | | 4/1999 | Yagi et al. | 324/660 |
| 5,977,781 A | | 11/1999 | Jordil | 324/658 |
| 6,205,220 B1 | | 3/2001 | Jacobsen et al. | 379/417 |

OTHER PUBLICATIONS

EPO Search Report Mar. 1, 2002; EP 00 31 0681.

* cited by examiner

Primary Examiner—N. Le
Assistant Examiner—Wasseem M. Mamdan
(74) Attorney, Agent, or Firm—Oliff & Berridge, PLC

(57) ABSTRACT

A transmission electrode 10 and a detection electrode 12 are placed in an electrode section of a sensor and are capacity-coupled with a reception electrode placed on an opposed scale. Capacity change between the transmission electrode 10 and the reception electrode caused by displacement is detected with the detection electrode 12. A plurality of signals different in phase are supplied to the transmission electrode 10. The signal lines are wired like a zigzag using an upper layer and a lower layer and the distances between the signal lines and the detection electrode 12 are made substantially equal for making uniform the crosstalk amounts relative to the detection electrode 12.

13 Claims, 11 Drawing Sheets

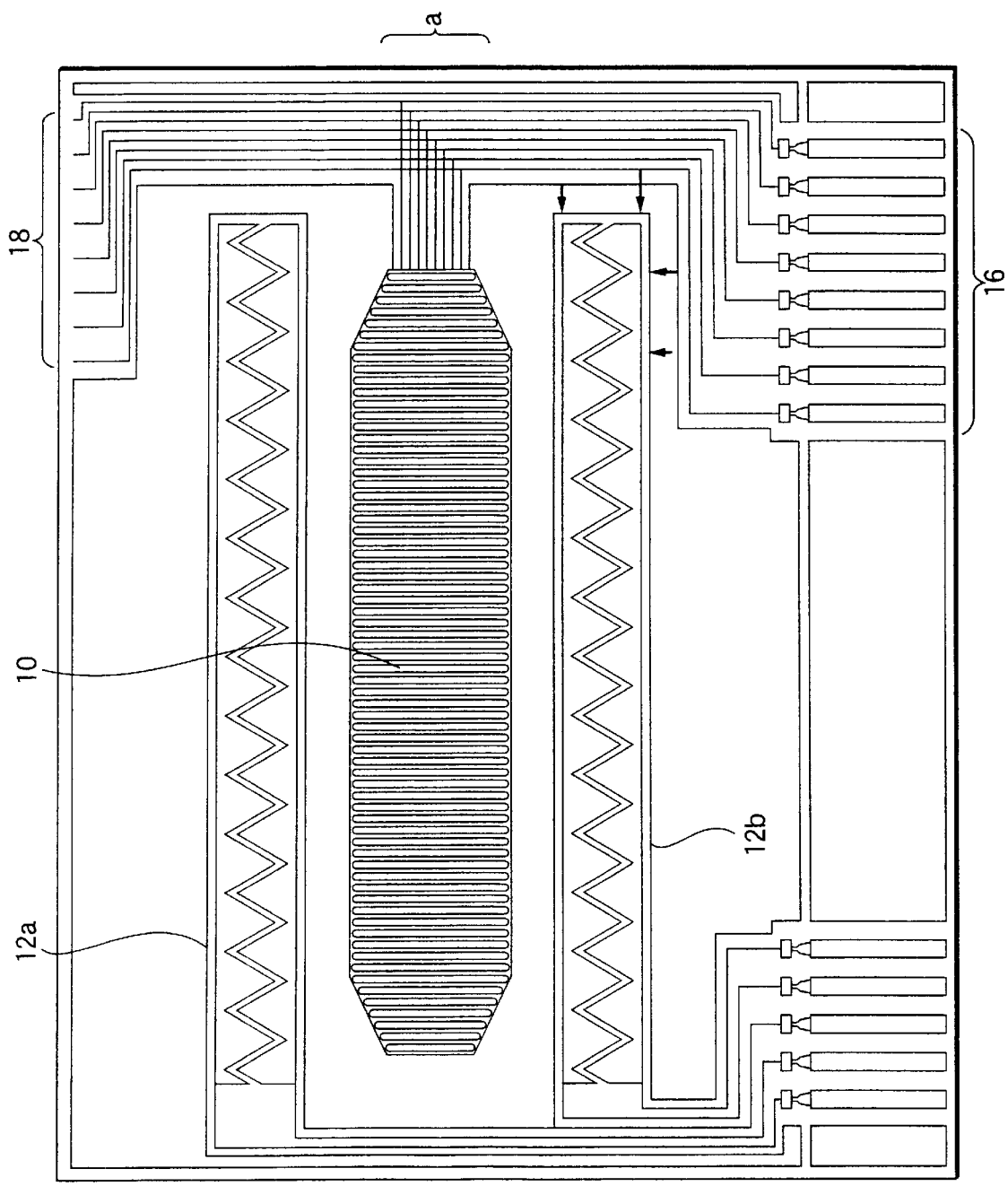

CAPACITANCE TYPE DISPLACEMENT DETECTION APPARATUS

This is a Continuation of application Ser. No. 09/727,700 filed Dec. 4, 2000, abandoned on Feb. 24, 2003. The entire disclosure of the prior application(s) is hereby incorporated by reference herein in its entirety.

BACKGROUND OF THE INVENTION

1. Field of the Invention

The present invention relates to a capacitance type displacement detection apparatus and in particular to crosstalk suppression between a transmission electrode and a detection electrode.

Further, the present invention relates to a capacitance type displacement detection apparatus and in particular to crosstalk suppression between a signal line group for supplying signals to a transmission electrode and a signal line group for transferring signals from a detection electrode.

2. Description of the Related Art

A capacitance type displacement detection apparatus, which will be hereinafter referred to as capacitance type sensor, comprises a transmission electrode, a reception electrode and a detection electrode. The transmission electrode and the reception electrode are formed on two scales placed in a relatively movable manner. The detection electrode detects change in the magnitude of capacity coupling between the transmission electrode and the reception electrode with a movement of the scale.

Specifically, as the transmission electrode, a plurality of electrodes are arranged so as to form a transmission electrode group. At least three types, preferably eight or more types of AC signals different in phase by predetermined phase angle are supplied to the electrode group from a processing circuit (circuit board) using a signal line group. When the opposed scale is displaced, a composite signal responsive to the displacement occurs on the reception electrode. The composite signal is detected with the detection electrode and is transferred to the processing circuit using the signal line group. The detection electrode comprises at least one electrode, preferably two or more electrodes. If the number of electrodes is two or more, a signal is detected with the two electrodes having differential relationship. By using the difference therebetween, noise contained in the detected signal can be removed and therefore the detection accuracy is increased.

However, if the transmission and detection electrodes are formed nearby on the same scale with the demand for miniaturizing the sensor, the signal lines for supplying a plurality of signals (eight types of signals) to the transmission electrode group and the detection electrode are directly capacity-coupled, causing crosstalk to occur; this is a problem. Particularly, if the distances between the detection electrode and the eight signal lines vary, the degree of the crosstalk of one of the signal lines affecting the detection electrode differs from the that of another. Thus, if the differential relationship is used, the crosstalk component remains and it becomes difficult to detect displacement with high accuracy.

Of course, as shown in FIG. 13, a configuration wherein a transmission electrode 210 and detection electrodes 212 formed on the same scale are placed away from each other as much as possible and electromagnetic shielding is provided between the two electrodes is also proposed. In this configuration, however, the electrode section area is increased and thus it becomes disadvantageous for miniaturizing the sensor.

In addition, it is also proposed to form integrally a signal line group for supplying signals to a transmission electrode group and a signal line group for transferring signals from a detection electrode group on an FPC (flexible printed circuit); however, if both the signal line groups are formed nearby, crosstalk of mixing signals in the transmission signal line group into the detection signal line group occurs; this is a problem. Particularly, if distances between the transmission signal line group and the detection signal line group vary, the degrees of crosstalk differs. Thus, if the differential relationship is used, the crosstalk component remains and it becomes difficult to detect displacement with high accuracy; this is also a problem.

Of course, as shown in FIG. 14, a configuration wherein a transmission signal line group 310 and a detection signal line group 312 formed on the same FPC are placed away from each other as much as possible, and electromagnetic shielding is provided between the two signal line groups is also proposed. In this configuration, however, the FPC area is increased and thus it becomes disadvantageous for furthermore miniaturizing the sensor.

SUMMARY OF THE INVENTION

It is therefore a first object of the invention to provide an apparatus capable of suppressing degradation of detection accuracy caused by crosstalk between a transmission electrode (containing signal lines) and a detection electrode without incurring an increase in the area of an electrode section.

It is a second object of the invention to provide an apparatus capable of suppressing degradation of detection accuracy caused by crosstalk between a transmission signal line group for supplying signals to a transmission electrode group and a detection signal line group for transferring signals from a detection electrode group without incurring an area increase.

The first object according to the present invention can be achieved by a capacitance type displacement detection apparatus having a transmission electrode and a detection electrode formed on one scale and capacity-coupled with a reception electrode formed on the other scale opposite to the one scale. The apparatus comprises: a plurality of transmission signal lines disposed on the one scale at substantially equal distance from the detection electrode for supplying signals to the transmission electrode.

To make the distances between the plurality of signal lines and the detection electrode substantially equal, the distances between the respective signal lines and the detection electrode are made substantially equal, and in addition, if a plurality of the detection electrodes exist, the distances between the signal lines and one detection electrode and the distances between the signal lines and another detection electrode are made substantially equal. The amount of crosstalk given by each signal line to the detection electrode depends on the distance from the signal line. Then, the distances between the respective signal lines and the detection electrode are made substantially equal, namely, are made uniform, whereby variations in the crosstalk amounts from the signal lines can be suppressed. If a plurality of the detection electrodes exist, the distances between the signal lines and one detection electrode and the distances between the signal lines and another detection electrode are made substantially equal, namely, are made uniform. Accordingly, the crosstalk amounts given to the detection electrodes can be made equal for suppressing variations in the crosstalk amounts between the detection electrodes.

Here, "substantially equal (or same) distance" means equal distance to such an extent that the ratios of the crosstalk components mixed from the transmission signal lines can be regarded substantially equal on the detection electrode.

Preferably, the plurality of signal lines have a multi-layer structure. To make the distances between the respective signal lines and the detection electrode substantially equal, preferably the signal lines are made to cross each other and the distances are made substantially equal as a whole. However, if the signal lines are formed in the same layer, they come in contact with each other and it is made impossible to supply a plurality of signals to the transmission electrode. The signal lines are placed in a multi-layer structure, whereby it is made possible to cross the signal lines without bringing them into contact with each other, and the distances between the respective signal lines and the detection electrode can be made substantially equal easily.

Further, the first object according to the present invention can be achieved by a capacitance type displacement detection apparatus having a transmission electrode and a detection electrode formed on one scale and capacity-coupled with a reception electrode formed on the other scale opposite to the one scale. The apparatus comprises: a plurality of transmission signal lines disposed on the one scale for supplying signals to the transmission electrode, the transmission signal lines having a differential relationship and disposed adjacently to each other with respect to the detection electrode. The signal lines having the differential relationship are made adjacent to each other, more specially, the signal lines having the differential relationship are disposed at substantially equal distance with respect to the detection electrode. Accordingly, the crosstalk amounts given by the signal lines to the detection electrodes can be set almost equal and can cancel each other out. The "differential relationship" means the mutually opposite phase (180-degree phase shift) relationship.

The second object according to the present invention can be achieved by a capacitance type displacement detection apparatus having a transmission electrode group and a detection electrode group formed on one scale and capacity-coupled with a reception electrode formed on the other scale opposite to the one scale. The apparatus comprises: a transmission signal line group for supplying signals to the transmission electrode group, the transmission signal line group having at least two transmission signal lines and disposed on a first wiring layer; and a detection signal line group for transferring signals from the detection electrode group, the detection signal line group having at least two detection signal lines and disposed on a second wiring layer different from the first wiring layer, the detection signal lines having a differential relationship and disposed at substantially equal distance from the transmission signal line group. The transmission signal line group and the detection signal line group are not placed on the same plane of an FPC, for example, unlike those in the related art and are formed in different layers of a multi-layer structure, so that the transmission signal line group and the detection signal line group can be placed away from each other while area increase is suppressed. The signal lines having differential relationship, contained in the detection signal line group, namely, the signal lines for transferring signals different in phase by 180 degrees are placed at substantially equal distance from the transmission signal line group, whereby the crosstalk components mixed into the signal lines having differential relationship become substantially equal and difference calculation is executed, whereby the crosstalk components can be removed. Here, the term "group" of "transmission signal line group" and "detection signal line group" means a plurality of signal lines. In addition, the term "substantially equal distance" means equal distance to such an extent that the ratios of the crosstalk components mixed from the signal lines contained in the transmission signal line group can be regarded substantially equal on two detection signal lines.

In the invention, preferably an electromagnetic shielding layer is formed between the layer where the transmission signal line group is formed and the layer where the detection signal line group is formed. The electromagnetic shielding layer is provided, whereby the crosstalk component itself can be attenuated.

In the invention, forming the detection signal line group in a plurality of layers is also preferred. The detection signal line group is separated into a plurality of layers, whereby mixing of the crosstalk components from the transmission signal line group can be controlled and suppressed more reliably.

The second object according to the present invention can be also achieved a capacitance type displacement detection apparatus having a transmission electrode group and a detection electrode formed on one scale and capacity-coupled with a reception electrode formed on the other scale opposite to the one scale. The apparatus comprises: a transmission signal line group for supplying signals to the transmission electrode group, the transmission signal line group including at least two transmission signal lines having a differential relationship and disposed on a first wiring layer; and a detection signal line for transferring a signal from the detection electrode, the detection signal line disposed on a second wiring layer different from the first wiring layer at substantially equal distance from the transmission signal lines having the differential relationship. If one detection electrode rather than a plurality of detection electrodes exist, the transmission signal line group and the detection signal line are formed in different layers, whereby they can be placed away from each other. If one detection signal line only exists, the difference cannot be calculated, but the distances between the signal lines having differential relationship, contained in the transmission signal line group and the detection signal line are made substantially equal, so that the crosstalk from one signal line and that from another cancel each other out and noise can be decreased. Forming an electromagnetic shielding layer between the layer where the transmission signal line group is formed and the layer where the detection signal line is formed is also preferred.

BRIEF DESCRIPTION OF THE DRAWINGS

FIG. 4 is a drawing to show the configuration of an electrode section of another embodiment of the invention;

DETAILED DESCRIPTION OF THE PREFERRED EMBODIMENTS

Referring now to the accompanying drawings, there are shown preferred embodiments of the invention.

Figure 1:
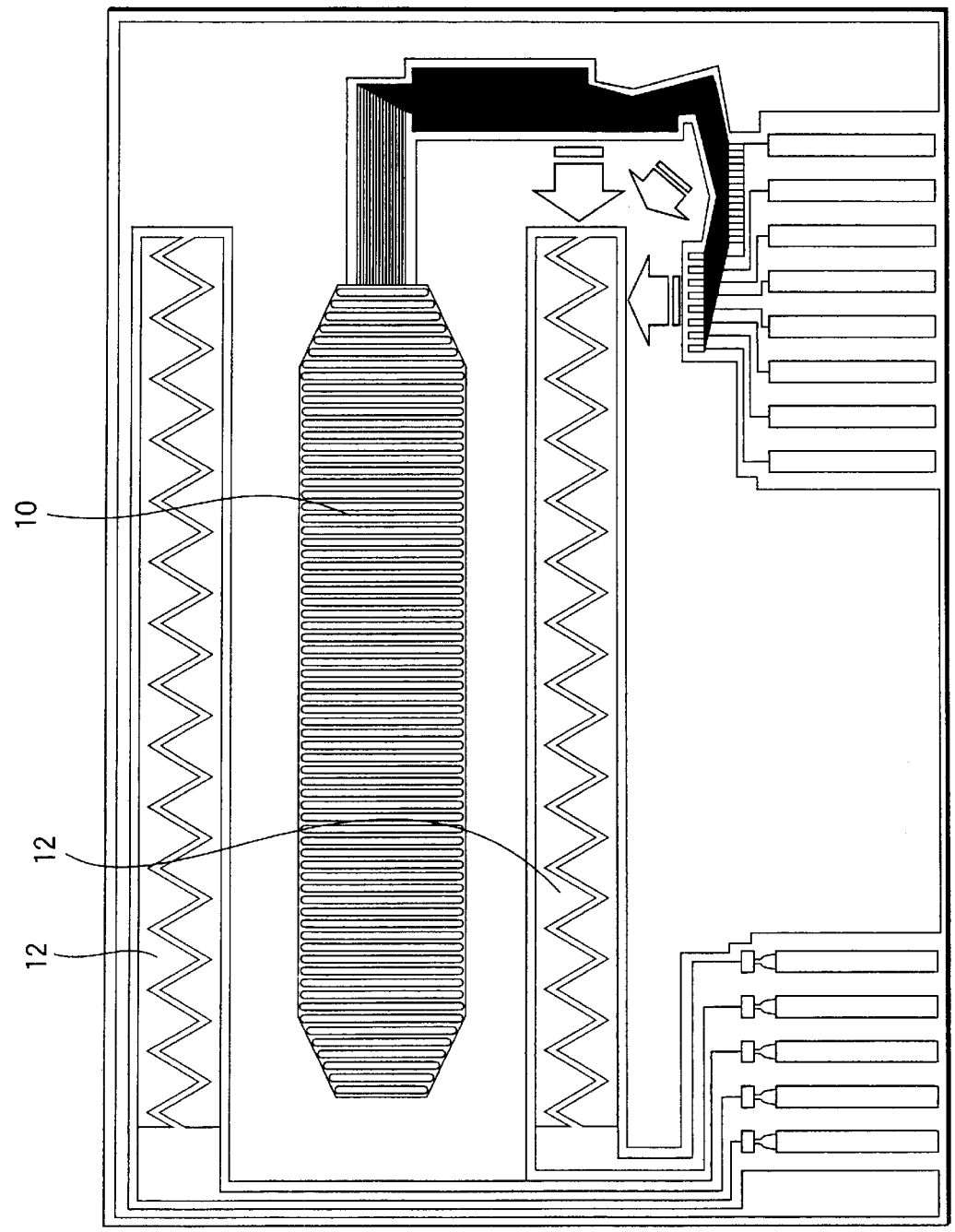
FIG. 1 is a drawing to show the configuration of an electrode section of an embodiment of the invention.

First, a capacitance type sensor, according to the present invention, which can suppress a degradation of detection accuracy caused by crosstalk between a transmission electrode and a detection electrode will be described in detail. FIG. 1 shows the configuration of an electrode section of a capacitance type sensor of an embodiment of the invention. A transmission electrode 10 and two detection electrodes 12 are provided and are capacity-coupled with a reception electrode placed on an opposed scale (not shown). Eight types of AC signals different in phase, for example, by 45 degrees are supplied to the transmission electrode 10 using eight signal lines. The two detection electrodes 12 are placed so as to sandwich the transmission electrode 10, and output two detection signals having differential relationship, namely, detection signals having phases opposite to each other. The difference between the two detection signals having differential relationship is calculated, whereby the mixed noise component can be removed effectively.

The eight signal lines for supplying, for example, eight types of AC signals to the transmission electrode 10 are routed from the sensor electrode section to the transmission electrode 10. Since the signal line route area is also reduced with miniaturization of the sensor section, it is difficult to provide sufficient distances between the signal lines and the detection electrode 12. In this case, if the eight signal lines (for convenience, these are signal lines i (i=1, 2, . . . 8)) are simply arranged and wired, the distances between the respective signal lines and the detection electrode 12 differ (for example, the signal line 1 is always nearest to the detection electrode 12 and the signal line 8 is placed farthest from the detection electrode 12) and the crosstalk components vary. The signal reduced on the reception electrode on the opposed scale is the composite signal of the eight types of signals supplied to the transmission electrode 10. The composite signal responsive to displacement is detected with the detection electrode 12, thereby detecting the displacement amount. Thus, if the crosstalk amounts vary, the detection accuracy is degraded.

Then, in the embodiment, the wiring pattern of the eight signal lines for supplying, for example, eight types of AC signals to the transmission electrode 10 as shown in the figure is devised and upper and lower wiring layers are used for alternate wiring so that the distances between the respective signal lines i (i=1, 2, . . . 8) and the detection electrode 12 (in the figure, the lower detection electrode 12) become constant.

Figure 2:
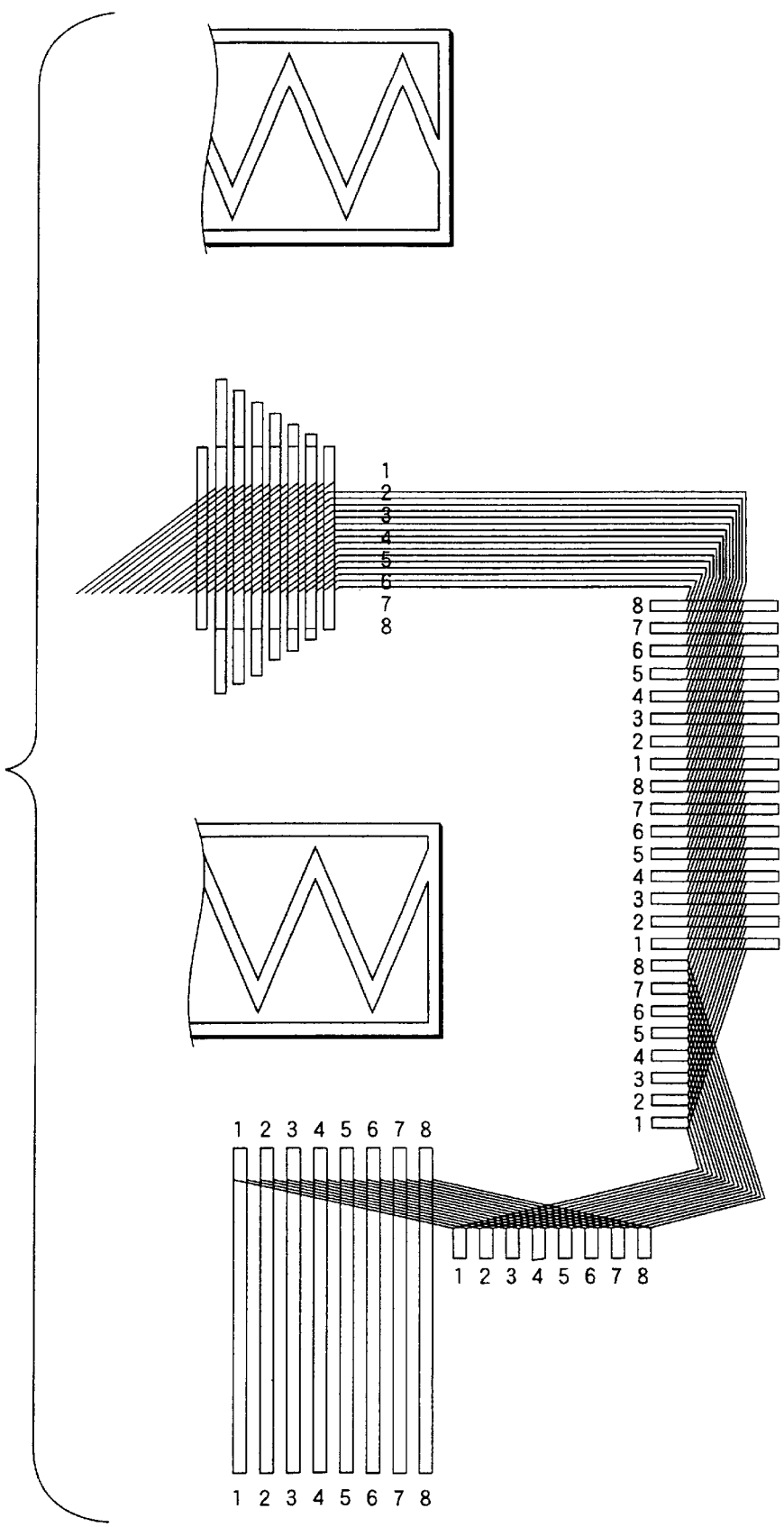
FIG. 2 is a schematic drawing of signal lines in FIG. 1.
Figure 3B:
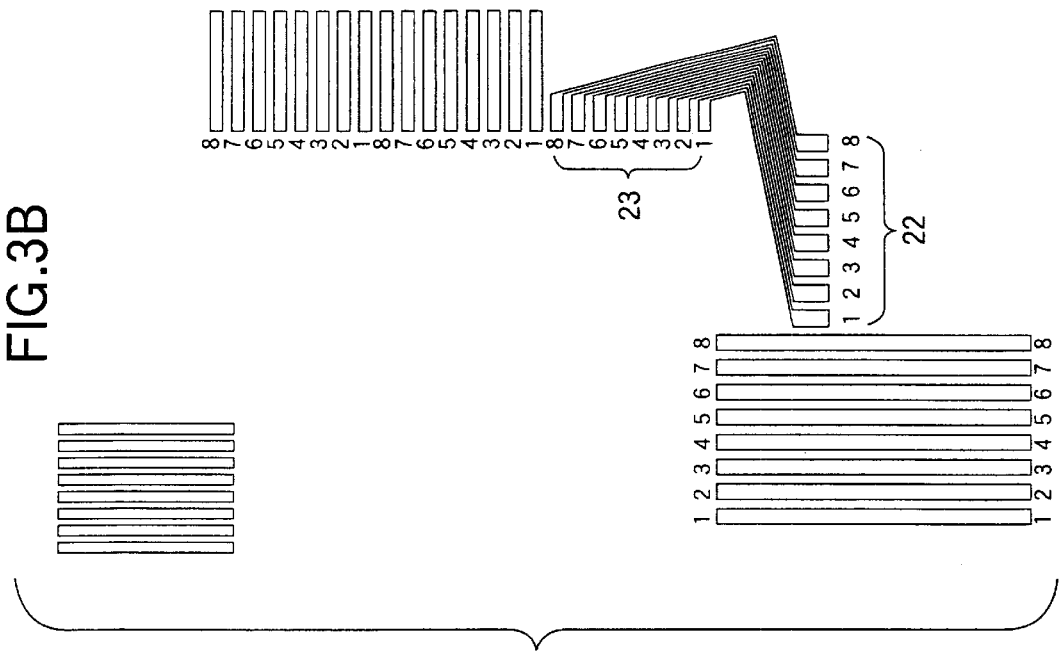
FIGS. 3A–B are respectively detailed wiring schematics representation of FIG. 2.
Figure 3A:
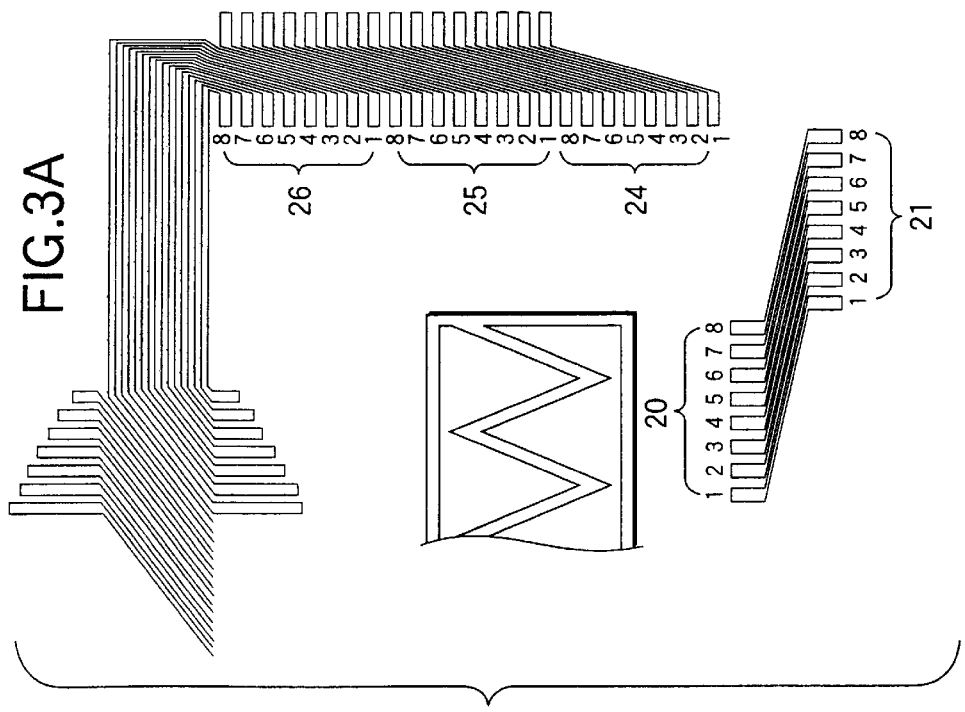

FIG. 2 shows wiring of the eight signal lines in FIG. 1. FIGS. 3A–B show wiring patterns of the upper and lower wiring layers in FIG. 2. FIG. 3A shows the wiring pattern of the lower layer and FIG. 3B shows the wiring pattern of the upper layer. The lower layer is formed with an intermediate terminal section 20 consisting of a total of eight terminals of terminals 1, 2, . . . 8 from left to right in the figure. Eight AC signals are first supplied to the intermediate terminal section 20. In the proximity of the intermediate terminal section 20, an intermediate terminal section 21 consisting of eight terminals of terminals 1, 2, . . . 8 from left to right in the figure is placed at a position far from the intermediate terminal section 20 viewed from the detection electrode 12. The signal line 1 is wired by connecting the terminal 1 of the intermediate terminal section 20 and the terminal 1 of the intermediate terminal section 21, the signal line 2 is wired by connecting the terminal 2 of the intermediate terminal section 20 and the terminal 2 of the intermediate terminal section 21; likewise, the signal line i is wired by connecting the terminal i of the intermediate terminal section 20 and the terminal i of the intermediate terminal section 21.

On the other hand, as shown in FIG. 3B, an intermediate terminal section 22 electrically connected to the intermediate terminal section 21 is placed on the upper layer at the same position on the plane as the intermediate terminal section 21. An intermediate terminal section 23 comprising terminals 1, 2, . . . 8 arranged in a direction perpendicular to the terminals of the intermediate terminal section 22 so as to surround the detection electrode 12 is placed in the proximity of the intermediate terminal section 22. The signal line is wired by connecting two terminals so as to bend between the intermediate terminal sections 22 and 23. That is, the terminal 1 of the intermediate terminal section 22 and the terminal 1 of the intermediate terminal section 23 are connected by bend wiring, whereby the signal line 1 is wired. The terminal 2 of the intermediate terminal section 22 and the terminal 2 of the intermediate terminal section 23 are connected by bend wiring, whereby the signal line 2 is wired. As the signal lines between the intermediate terminal sections 20 and 21 on the lower layer, the signal line 8 is nearest to the detection electrode 12 and the signal line 1 is placed farthest from the detection electrode 12. In contrast, as the signal lines between the intermediate terminal sections 22 and 23 on the upper layer, the signal line 1 is nearest to the detection electrode 12 and the signal line 8 is placed farthest from the detection electrode 12. Therefore, the distances to the detection electrode 12 from the respective signal lines from the terminal section 20 to the terminal section 23 are almost equal.

As shown in FIG. 3A, an intermediate terminal section 24 electrically connected to the intermediate terminal section 23 is placed on the lower layer at the same position on the plane as the intermediate terminal section 23. An intermediate terminal section 25 is placed side by side with the intermediate terminal section 24 at almost equal distance viewed from the detection electrode 12. An intermediate terminal section 26 is placed side by side in the same arrangement as the intermediate terminal section 24, 25. The intermediate terminal sections 24 and 25 comprise terminals arranged in a direction perpendicular to the terminal arrangement of the intermediate terminal sections 20 to 22 (terminals 1, 2, . . . 8 are arranged from bottom to top in the figure) like the intermediate terminal section 23. The intermediate terminal sections 25 and 26 comprise terminals 1, 2, . . . 8 arranged from bottom to top like the intermediate terminal section 24. The intermediate terminal sections 24 and 25 are place so as to become substantially symmetrical with respect to the center line of the detection electrode 12. The terminal 1 of the intermediate terminal section 24 and the terminal 1 of the intermediate terminal section 25 are connected in a slanting direction with respect to the detection electrode 12, whereby the signal line 1 is wired. The terminal 8 of the intermediate terminal section 24 and the terminal 8 of the intermediate terminal section 25 are connected in a slanting direction, whereby the signal line 8 is wired. The terminal 1 of the intermediate terminal section 25 and the terminal 1 of the intermediate terminal section 26 are connected in a slanting direction, whereby the signal line 1 is wired. The terminal 8 of the intermediate terminal section 25 and the terminal 8 of the intermediate terminal section 26 are connected in a slanting direction, whereby the signal line 8 is wired. Focusing attention on the signal lines 1 and 8, the signal line 8 connecting the terminal 8 of the intermediate terminal section 24 and the terminal 8 of the intermediate terminal section 25, and the signal line 1 connecting the terminal 1 of the intermediate terminal section 25 and the terminal 1 of the intermediate terminal section 26 are adjacent to each other and are almost equal in distance from the detection electrode 12. The signal line 1 connecting the terminal 1 of the intermediate terminal section 24 and the terminal 1 of the intermediate terminal section 25, and the signal line 8 connecting the terminal 8 of the intermediate terminal section 25 and the terminal 8 of the intermediate terminal section 26 are also almost equal in distance from the detection electrode 12. Therefore, the amount of crosstalk given by the signal line 1 to the detection electrode 12 and that given by the signal line 8 to the detection electrode 12 are almost equal. This fact also applies to other signal lines. Eight types of signals of the signal lines 1 to 8 are supplied from the intermediate terminal section 26 to the transmission electrode 10.

Thus, in the embodiment, a plurality of signal lines of the transmission electrode are wired using the upper and lower wiring layers, whereby the distances between the respective signal lines and the detection electrode 12 are made substantially equal without bringing them into contact with each other. Accordingly, the crosstalk amounts mixed into the detection electrode 12 from the signal lines are also made uniform. Thus, a phase shift in the composite signal detected with the detection electrode 12 (or composite signal generated at the reception electrode in response to displacement with the transmission electrode 10) can be prevented and degradation of the detection accuracy can be suppressed.

FIG. 4 shows the configuration of an electrode section of a sensor in another embodiment of the invention. Two detection electrodes 12a and 12b are provided so as to sandwich a transmission electrode 10 as in FIG. 1. Eight signal lines for supplying, for example, eight types of AC signals to the transmission electrode 10 are wired. In the embodiment, the signal lines are wired so that the distances between the detection electrode 12a and the signal lines and the distances between the detection electrode 12b and the signal lines are made substantially equal. Specifically, the eight signal lines are routed from sensor section electrode to the transmission electrode 10 so as to bypass the detection electrode 12b, and likewise, are also wired so as to bypass the detection electrode 12a. Accordingly, the signal line distances to the detection electrodes 12a and 12b are almost made equal. Thus, almost equal crosstalk amount as the amount of crosstalk given by the eight signal lines to the detection electrode 12b is also given to the detection electrode 12a.

Figure 5A:
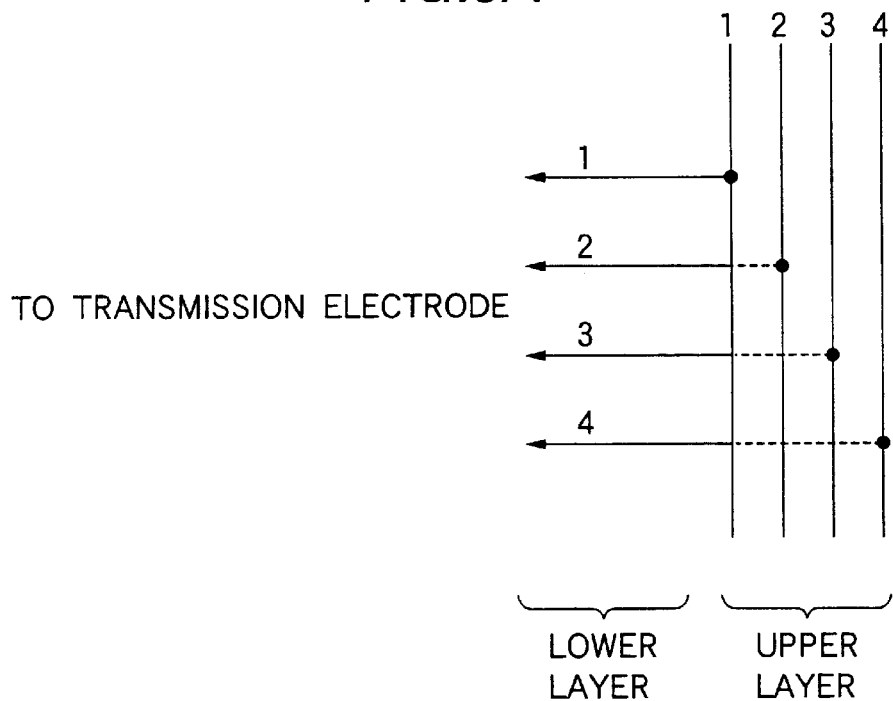
FIGS. 5A–B are respectively schematic drawings of a part a in FIG. 4.
Figure 5B:
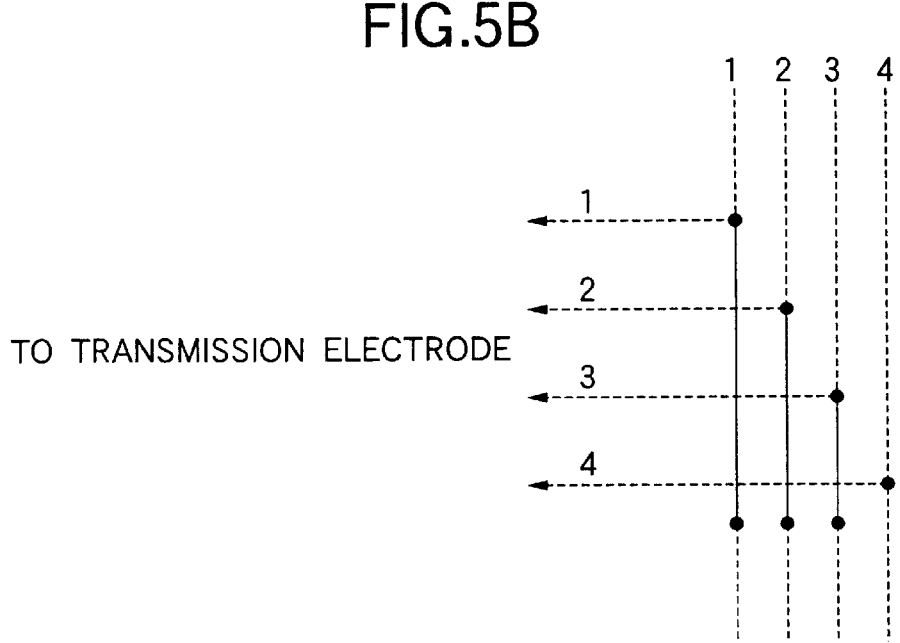

FIGS. 5A–B are respectively schematic drawings of a part a in FIG. 4. In FIG. 5A, a wiring pattern from an electrode 16 in the sensor section to an opposite electrode 18 is formed on the upper layer of a two-layer structure. The wiring pattern branches to lower layer wiring at a midpoint and is connected to the transmission electrode 10. For example, to connect the signal line 4 to the transmission electrode 10, the signal line 4 needs to cross the signal lines 1, 2, and 3; however, if the signal lines 1, 2, and 3 are upper layer wiring, the signal line 4 can be connected to the transmission electrode 10 without coming in contact with the signal lines.

In FIG. 5B, of the wiring pattern from the electrode 16 in the sensor section to the opposite electrode 18, the portion crossing the wiring pattern toward the transmission electrode 10 is formed on the upper layer of the two-layer structure (solid lines in the figure). For example, the signal line 1 is formed as lower layer wiring from the electrode 16, but becomes upper layer wiring at a midpoint and is routed to the electrode 18 without crossing the signal line 2, 3, or 4 routed to the transmission electrode 10. Then, the signal lime 1 again becomes lower layer wiring, and is routed to the electrode 18 and branches to the transmission electrode 10. Thus, the signal line 1 is connected to the electrode 18 and the transmission electrode 10. The signal line 2 is formed as lower layer wiring from the electrode 16, but becomes upper layer wiring at a midpoint and is routed to the electrode 18 without crossing the signal line 3 or 4 routed to the transmission electrode 10. Then the signal line 2 again becomes lower layer wiring, and is routed to the electrode 18 and branches to the transmission electrode 10. Thus, the signal line 2 is connected to the electrode 18 and the transmission electrode 10. In FIGS. 5A and 5B, of course, an insulating layer is formed between the upper and lower layers.

Thus, in the embodiment, considering that a plurality of signal lines produce crosstalk for the detection electrode 12b positioned between the transmission electrode 10 and sensor section electrode, an almost equal amount of crosstalk to that of the detection electrode 12b is also produced for the detection electrode 12a, so that the crosstalk amounts can be made uniform. The detection signal from the detection electrode 12a and the detection signal from the detection electrode 12b have differential relationship and the crosstalk amounts contained in both the signals are made uniform, so that displacement can be detected more reliably.

Figure 6:
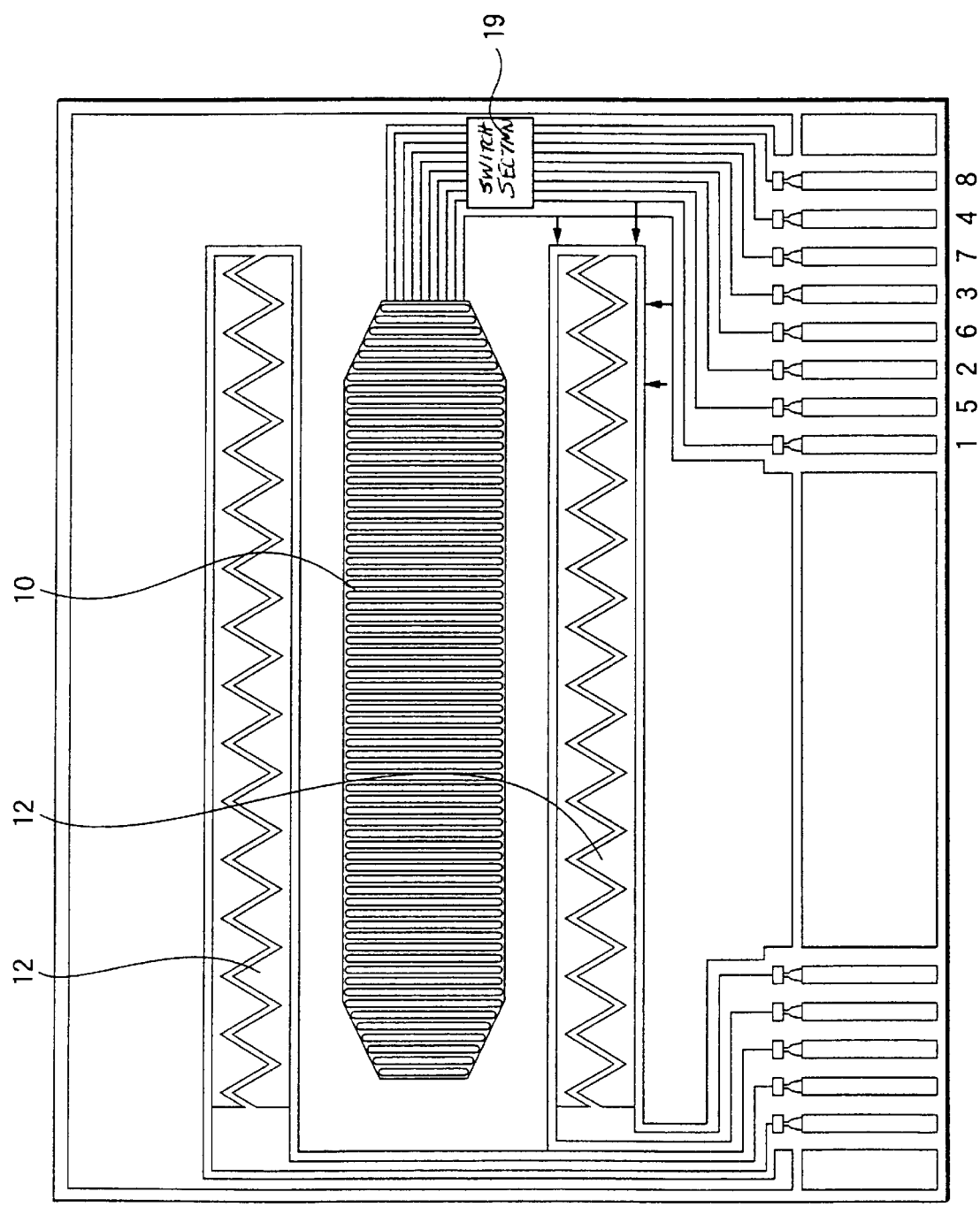
FIG. 6 is a schematic drawing of still another embodiment of the invention.

FIG. 6 shows the configuration of an electrode section of a sensor in another embodiment of the invention. In the embodiment, of eight signal lines for supplying eight types of AC signals to a transmission electrode 10, the signal lines having differential relationship are wired so as to become adjacent to each other. Since the eight signal lines i (i=1, 2, . . . 8) have phases shifted by 45 degrees, the signal lines 1 and 5 have differential relationship of the mutually opposite phase relationship and the signal lines 2 and 6, the signal lines 3 and 7, and the signal lines 4 and 8 also have differential relationship. The signal lines having the differential relationship are placed adjacently to each other; specifically the signal lines 1 and 5, 2 and 6, 3 and 7, and 4 and 8 are placed adjacently to each other as shown in the figure, whereby the distances between the two signal lines having the differential relationship and a detection electrode 12 become almost equal, and the amounts of crosstalk given from the signal lines having the differential relationship to the detection electrode 12 also become equal. Therefore, they cancel each other and the crosstalk can be suppressed effectively.

Figure 7:
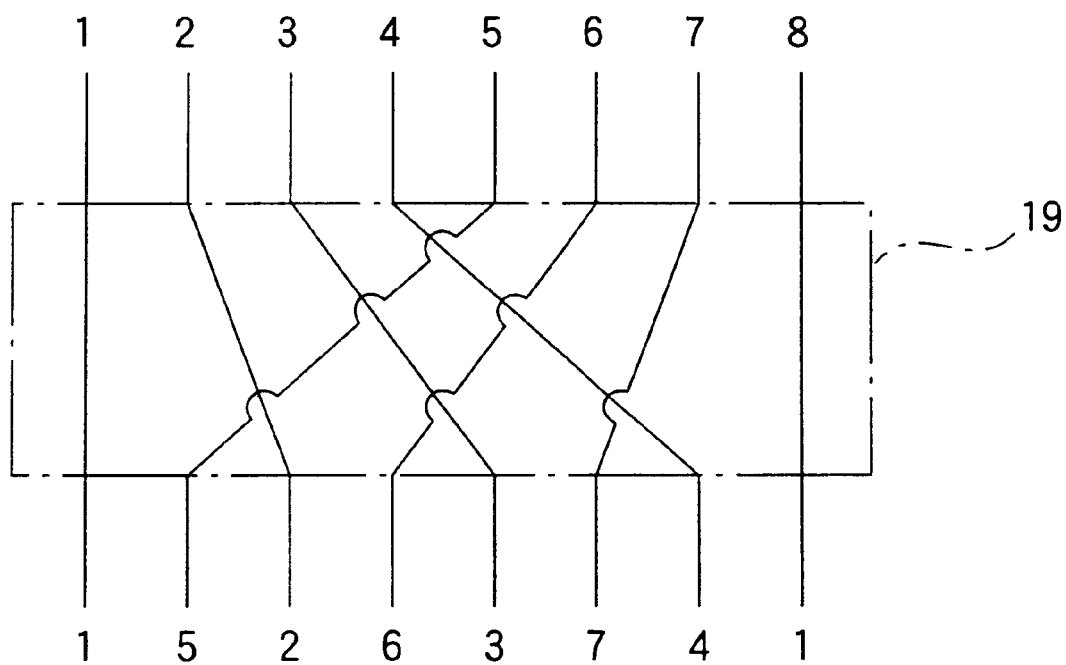
FIG. 7 is a schematic representation of changing the signal line wiring order in a switch section in FIG. 6.

Adjacent placing the signal lines having the differential relationship, of the eight signal lines is particularly effective in the portion where the detection electrode 12 and the signal lines are placed at comparatively short distance and are capacity-coupled for producing much crosstalk. However, the signal lines need to be wired in a predetermined order relative to the detection electrode 10, and thus it is desirable to provide means for canceling the adjacent relationships among the signal lines (in the figure, the order of the signal lines 1, 5, 2, 6, 3, 7, 4, 8) at any part so as to restore the predetermined order (the order of the signal lines 1, 2, 3, 4, 5, 6, 7, 8). In the figure, a switch section 19 is placed at a part where it is away from the detection electrode 12 and capacity coupling does not occur. The wiring order is restored to the predetermined order through the switch section 19. FIG. 7 shows how the wiring order is changed in the switch section 19. The signal line wiring order is thus changed to the predetermined order, so that the eight AC signals having phases shifted by 45 degrees relative to the transmission electrode 10 can be supplied easily.

Although the invention has been described in its preferred embodiments, the invention is not limited to the specific embodiments and various changes can be made without departing from the spirit and the scope of the invention. For example, the zigzag wiring pattern using the upper and lower layer terminals can be applied not only to one detection electrode 12 as shown in FIG. 1, but also to the other detection electrode 12. This also applies to the configuration previously described with reference to FIG. 4.

In the description of the embodiments, the eight types of AC signals are supplied to the transmission electrode, but the invention is not limited to the case; displacement can be detected even with at least three types of AC signals.

In FIG. 1, the terminals in the structure of the upper and lower layers are used, but a multi-layer structure of three or more layers can also be used for wiring as required. In FIG. 1, the number of intermediate terminal sections is five, but as many intermediate terminal sections as six or more or four or less may be used as required.

Further, using the configurations in FIGS. 1 and 6 in combination is also preferred. That is, in the configuration in FIG. 1, the signal lines are not wired in the order of the signal lines 1, 2, 3, 4, 5, 6, 7, 8 and the signal lines having the differential relationship may be wired so as to become adjacent to each other in the order of the signal lines 1, 5, 2, 6, 3, 7, 4, 8, and further may be wired in the upper and lower layers for making uniform the distances between the respective signal lines and the detection electrode 12.

Figure 8:
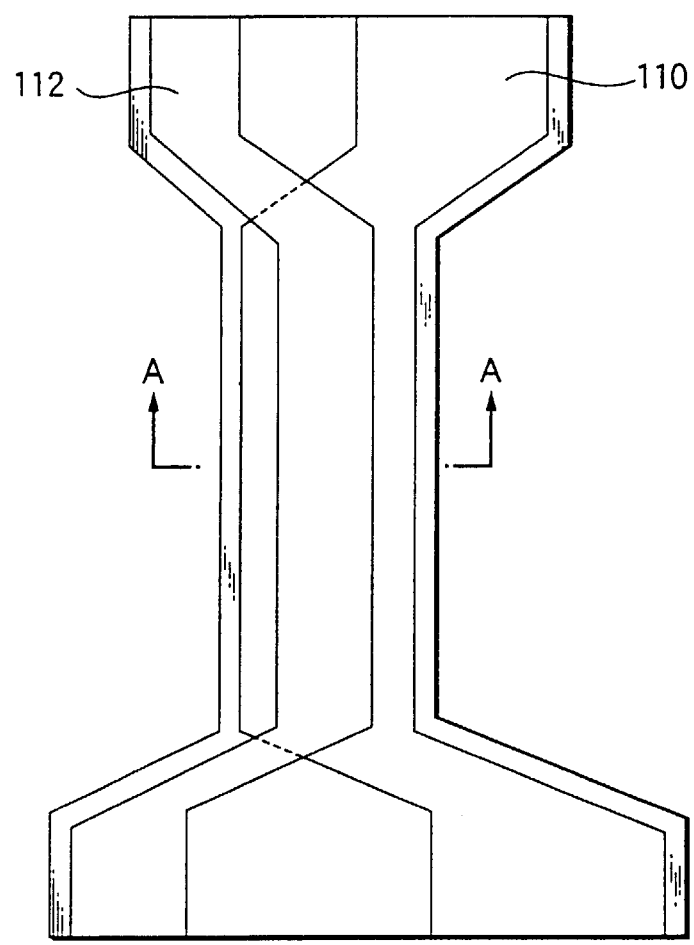
FIG. 8 is a plan view of a wiring portion of a an embodiment of the invention.

Next, a capacitance type sensor, according to the present invention, which can suppress a degradation of detection accuracy caused by crosstalk between a transmission signal line group and a detection signal line group will be described in detail. FIG. 8 is a plan view of a wiring portion of a capacitance type sensor in an embodiment of the invention, namely, a portion for transferring signals between an electrode section and a processing circuit of the sensor. A transmission signal line group 110, and a detection signal line group 112 are formed on an FPC. The transmission signal line group 110 supplies AC signals from the processing circuit to a transmission electrode group. The detection signal line group 112 transfers signals from a detection electrode group to the processing circuit. In the embodiment, however, the signal line groups are not formed adjacently to each other in the same plane of the FPC unlike those in the related art, and the transmission signal line group 110 (in fact, a plurality of, for example, eight transmission signal lines exist, but are shown in one group in the figure for simplicity) and the detection signal line group 112 (for example, a total of four detection signal lines of two pairs of differential electrodes exist, but are shown in one group in the figure) are formed in different layers of a multi-layer structure. In the figure, the transmission signal line group 110 is formed in the lower layer and the detection signal line group 112 is formed in the upper layer.

Figure 9:
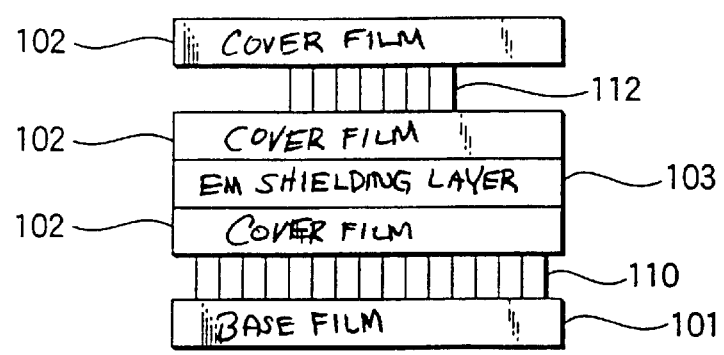
FIG. 9 is a sectional view taken on line A—A in FIG. 8.

FIG. 9 is a sectional view taken on line A—A in FIG. 8. The transmission signal line group 110 containing eight transmission signal lines is formed on abase film 101. A cover film 102 is formed on the transmission signal line group 110. An electromagnetic shielding layer 103 for suppressing crosstalk between the transmission signal line group 110 and the detection signal line group 112 is formed on the cover film 102. Preferably, the electromagnetic shielding layer 103 completely shuts off signals from the transmission signal line group 110, but may be formed to such an extent that it can shut off the signals reasonably. Another cover film 102 is formed on the electromagnetic shielding layer 103. The detection signal line group 112 containing four detection signal lines is formed on the cover film 102. The four detection signal lines contained in the detection signal line group 112 are further grouped into two pairs of signal lines for detecting signals having differential relationship (one signal A and another signal A' having a 180-degree phase shift from the signal A). Assume that the four detection signal lines contained in the detection signal line group 112 are 112*a*, 112*b*, 112*c*, and 112*d* and that the signal lines 112*a* and 112*b* have differential relationship and 112*c* and 112*d* have differential relationship. In this case, to form the detection signal line group 112 on the cover film 102, the signal lines having differential relationship are formed so that they are placed at substantially equal distance from the transmission signal line group 110. That is, the signal lines 112*a* and 112*b* are formed so as to be at almost equal distance from the transmission signal line group 110, and the signal lines 112*c* and 112*d* are formed so as to be at almost equal distance from the transmission signal line group 110 (in the figure, the signal lines 112*a*, 112*b*, 112*c*, and 112*d* are formed in order from left to right). Another cover film 102 is formed on the detection signal line group 112.

When the detection signal lines having differential relationship are thus placed so as to become at almost equal distance from the transmission signal line group 110, even if signals from the transmission signal line group 110 pass through the shielding layer 103, and are mixed in the detection signal line group 112 containing the signal lines having differential relationship, crosstalk occurs at almost the same ratio from the transmission signal line group 110 containing the eight signal lines, so that their differences are calculated, whereby it is made possible to remove the crosstalk components.

Figure 10:
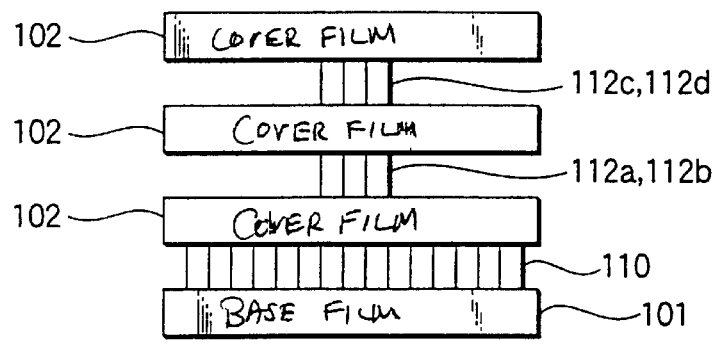
FIG. 10 is another sectional view taken on line A—A in FIG. 8.

FIG. 10 is another sectional view taken on line A—A in FIG. 8. A transmission signal line group 110 containing eight signal lines is formed on a base film 101 as in FIG. 9, and a cover film 102 is formed on the transmission signal line group 110. A first detection signal line group 112 is formed on the cover film 102 and another cover film 102 is formed, then a second detection signal line group 112 is formed. The first detection signal line group 112 is a signal line group consisting of signal lines having differential relationship (signal lines 112*a* and 112*b*) and the second detection signal line group 112 is also a signal line group consisting of signal lines having differential relationship (signal lines 112*c* and 112*d*). Another cover film 102 is formed on the second detection signal line group 112.

In the embodiment, the transmission signal line group 110 and the detection signal line groups 112 are formed in different layers and further the signal lines having differential relationship in the first detection signal line group 112 and those in the second detection signal line group 112 are formed in different layers. The signal lines 112*a* and 112*b* are at almost equal distance from the transmission signal line group 110 containing eight signal lines. The signal lines 112c and 112d are also at almost equal distance from the transmission signal line group 110. Accordingly, the differences therebetween are calculated, whereby crosstalk from the transmission signal line group 110 can be removed and a signal responsive to the electrostatic capacity with a reception signal line formed on an opposed scale can be taken out reliably.

Figure 11:
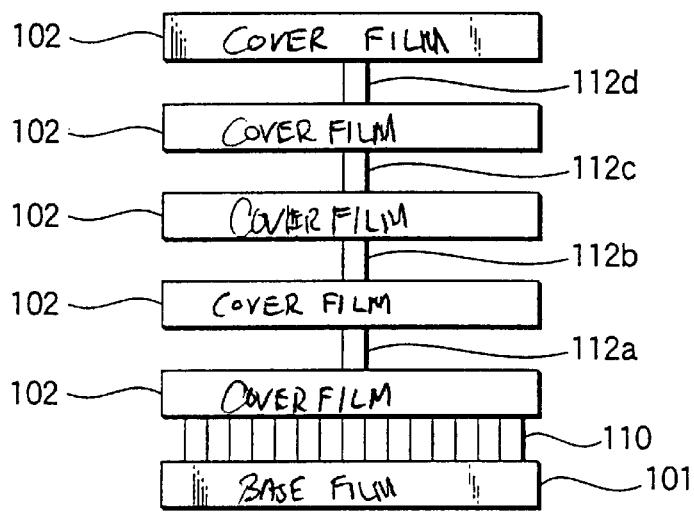
FIG. 11 is still another sectional view taken on line A—A in FIG. 8.

FIG. 11 is still another sectional view taken on line A—A in FIG. 8. A transmission signal line group 110 containing eight signal lines is formed on a base film 101 as in FIG. 9, and a cover film 102 is formed on the transmission signal line group 110. One signal line contained in a detection signal line group 112 consisting of four signal lines, for example, a signal line 112a is formed on the cover film 102 and another cover film 102 is formed. Then a signal line having differential relationship with the signal line 112a, for example, a signal line 112b is formed. The signal lines 112a and 112b are formed in nearby layers of the multi-layer structure and are placed in line in a direction perpendicular to the face where the transmission signal line group 110 is formed. Another cover film 102 is formed on the signal line 112b, one signal line having differential relationship with another signal line, for example, a signal line 112c is formed on the cover film 102, and another cover film 102 is formed, then the remaining signal line (signal line 112d) which has differential relationship with the signal line 112c is formed. The signal lines 112c and 112d are also formed in nearby layers of the multi-layer structure and are placed in line in the direction perpendicular to the face where the transmission signal line group 110 is formed In the configuration, the signal lines 112a and 112b having differential relationship are formed in the nearby layers, thus the crosstalk amounts from the transmission signal line group 110 become almost equal. Moreover, the signal lines 112a and 112b are placed so as to become at almost equal ratio of distances from the eight signal lines contained in the transmission signal line group 110, so that the ratios of the crosstalk amounts mixed from the eight signal lines in the transmission signal line group 110 become the same. Then the difference between the signals is calculated, whereby crosstalk can be removed. This also applies to the signal lines 112c and 112d.

Although the invention has been described in its preferred embodiments, the invention is not limited to the specific embodiments and various changes can be made without departing from the spirit and the scope of the invention. For example, in the configuration in FIG. 10 or 11, providing the electromagnetic shielding layer 103 as in the configuration in FIG. 9 is also preferred.

In the description of the embodiments, a plurality of detection electrodes exist, but the invention can also be applied to the case where only one detection electrode is placed. In this case, preferably one detection signal line is formed in a different layer from the layer of the transmission signal line group.

Figure 12:
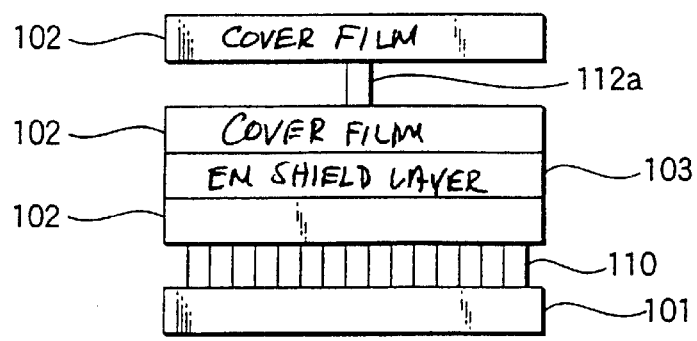
FIG. 12 is a sectional view of another embodiment.
Figure 13:
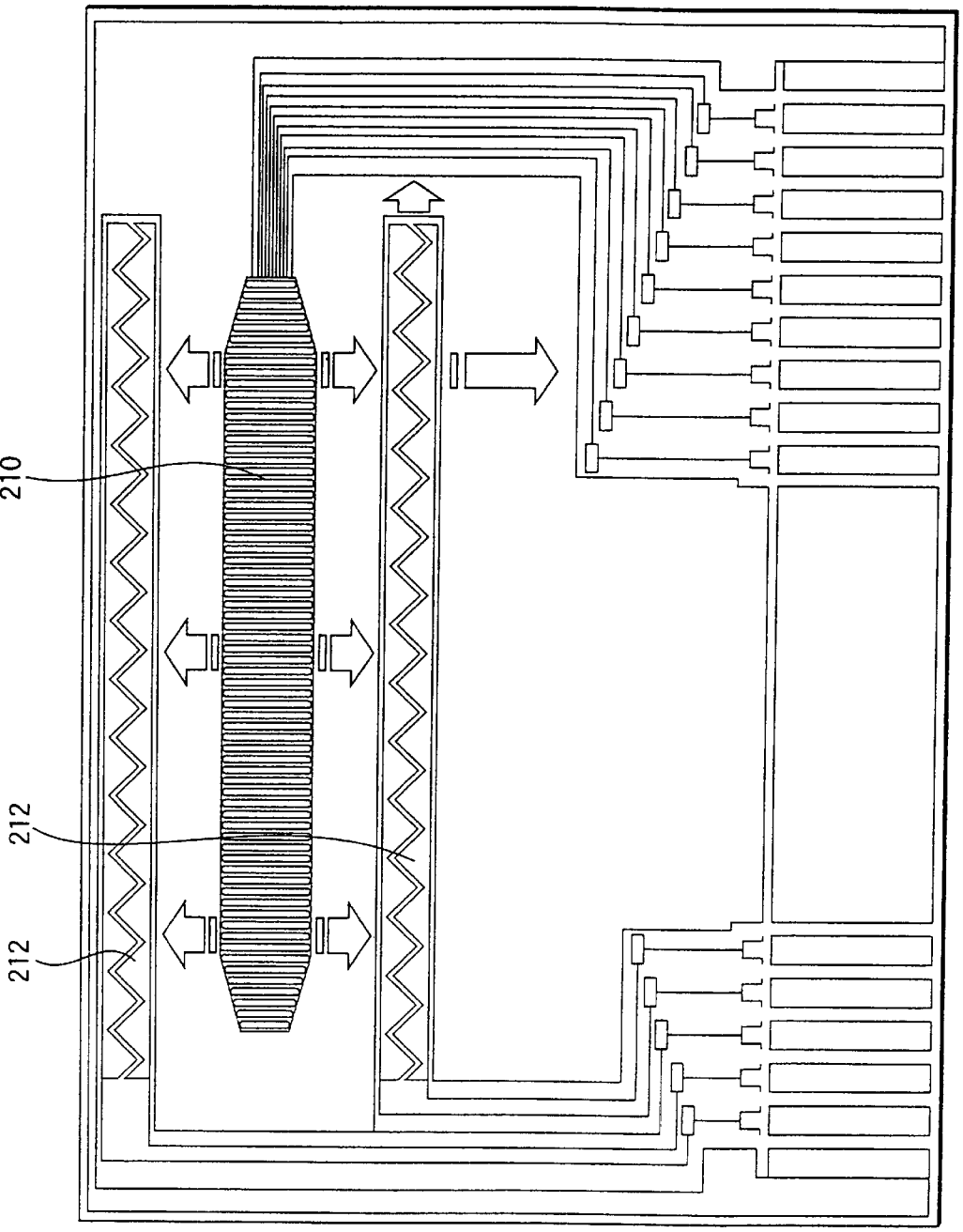
FIG. 13 is a drawing to show the configuration of an electrode section in a related art.
Figure 14:
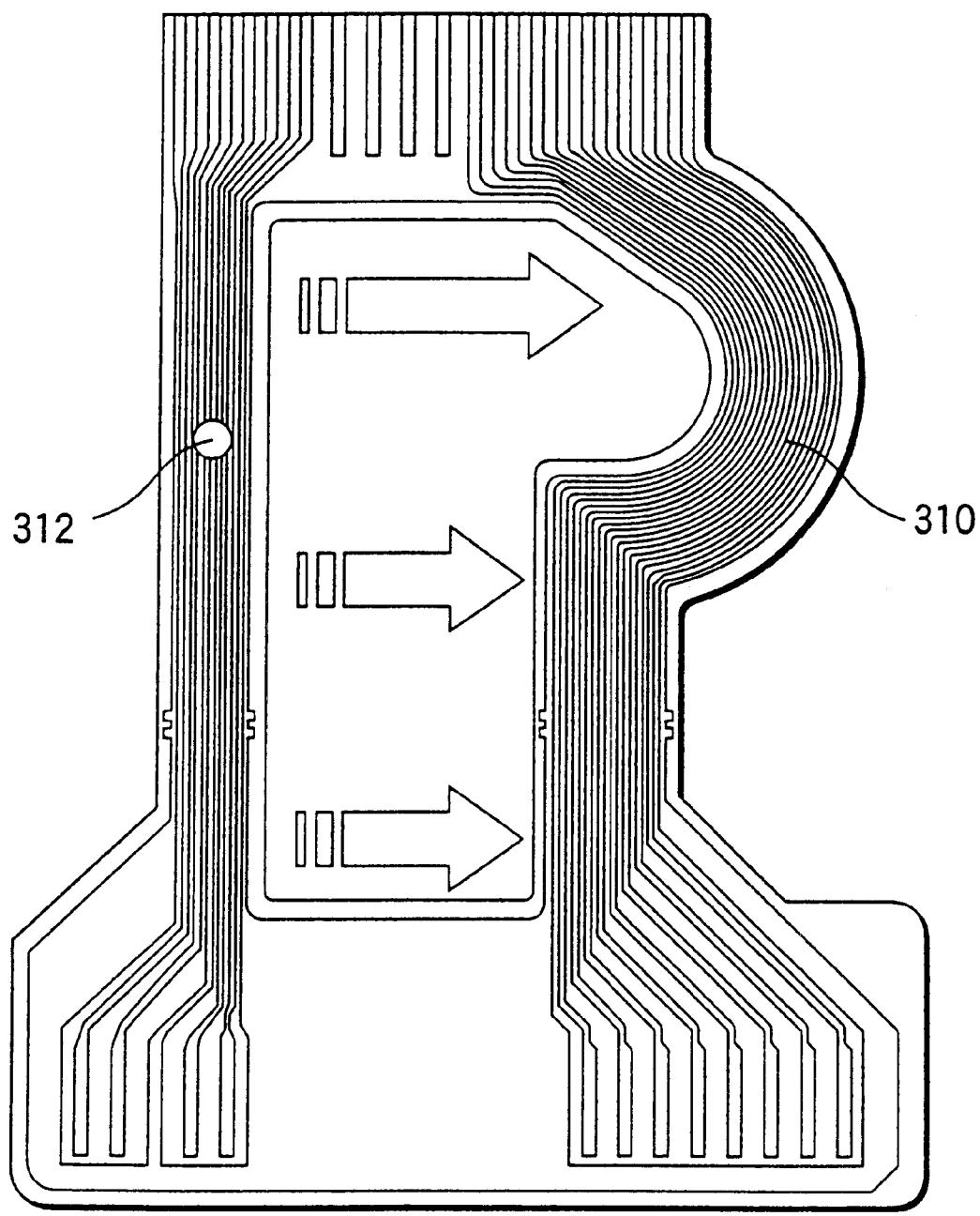
FIG. 14 is a plan view of a signal line portion in a related art.

FIG. 12 is a sectional view of a sensor comprising one detection electrode and one detection signal line. A transmission signal line group 110 containing eight transmission signal lines is formed on a base film 101 and a cover film 102 is formed on the transmission signal line group 110. An electromagnetic shielding layer 103 for suppressing crosstalk between the transmission signal line group 110 and a detection signal line 112a is formed on the cover film 102. The electromagnetic shielding layer 103 may be formed so as to completely shut off crosstalk like the electromagnetic shielding layer as in FIG. 9 or may be formed to such an extent that it can shut off crosstalk reasonably. Another cover film 102 is formed on the electromagnetic shielding layer 103 and the detection signal line 112a is formed on the cover film 102. Preferably, the distances between the detection signal line 112a and the transmission signal lines having differential relationship with each other are made substantially equal, whereby the crosstalk from one transmission signal line and that from another can cancel each other out. Specifically, to form the transmission signal line group 110, the signal lines in the transmission signal line group 110 are arranged at 0 degrees, 45 degrees, 90 degrees, 135 degrees, 315 degrees, 270 degrees, 225 degrees, and 180 degrees, and the detection signal line 112a may be placed almost at the center of the transmission signal lines at 135 degrees and 315 degrees. Thus, when viewed from the detection signal line 112a, the distances from the transmission signal lines at 0 degrees and 180 degrees become almost equal; the distances from the transmission signal lines at 45 degrees and 225 degrees become almost equal; the distances from the transmission signal lines at 90 degrees and 270 degrees become almost equal; and the distances from the transmission signal lines at 135 degrees and 315 degrees become almost equal. Almost equal amounts of crosstalk having mutually opposite phases are mixed into the detection signal line 112a and thus cancel each other out and it is made possible to decrease noise effectively.

As described above, according to the invention, degradation of detection accuracy caused by crosstalk between the transmission electrode containing the signal lines and the detection electrode and it is made possible to detect displacement with high accuracy.

Further, crosstalk of the transmission signal line group contained in the signals in the detection signal line group is removed and displacement between scales can be detected with high accuracy.

What is claimed is:

1. An electrode section for use as one scale of a capacitance type displacement detection apparatus and capacity-coupled with a reception electrode formed on other scale opposite to the one scale, said electrode section comprising:

a substrate comprising a plurality of wiring layers;

a transmission electrode and at least one detection electrode formed on the substrate; and a plurality of transmission signal lines separately patterned on at least two of the wiring layers electrically connected by intermediate terminal sections for supplying signals to the transmission electrode, wherein the transmission signal lines patterned on differing wiring layers are electrically connected and routed to cross paths and achieve crosstalk suppression with respect to the at least one detection electrode, and wherein the distances between the respective transmission signal lines and the detection electrode are substantially equal.

2. The electrode section as claimed in claim 1, wherein said electrode section has a plurality of detection electrodes and the plurality of the transmission signal lines disposed at substantially equal distance from each of the detection electrodes.

3. The electrode section of claim 1, wherein said electrode section has a plurality of detection electrodes and the plurality of the transmission signal lines are disposed at substantially equal distance from each of the detection electrodes.

4. The electrode section of claim 1, further comprising:
at least one insulating layer disposed between adjacent wiring layers.

5. The electrode section as claimed in claim 1, wherein said transmission signal lines have a differential relationship and are disposed adjacently to each other with respect to the at least one detection electrode.

6. A capacitance type displacement detection apparatus comprising the electrode section of claim 1.

7. An electrode section for use as one scale of a capacitance type displacement detection apparatus and capacity-coupled with a reception electrode formed on other scale opposite to the one scale, said electrode section comprising:

a substrate comprising a plurality of wiring layers;

a transmission electrode and at least one detection electrode formed on the substrate; and a plurality of transmission signal lines separately patterned on at least two of the wiring layers electrically connected by intermediate terminal sections for supplying signals to the transmission electrode, the transmission signal lines having a differential relationship and disposed adjacently to each other with respect to the at least one detection electrode, wherein the transmission signal lines patterned on differing wiring layers are electrically connected and routed to cross paths and achieve crosstalk suppression with respect to the at least one detection electrode.

8. The electrode section as claimed in claim 7, further comprising:

a switch portion for changing a wiring order of said transmission signal lines having the differential relationship and disposed adjacently to each other with respect to the at least one detection electrode, wherein each of said transmission signal lines is connected to a predetermined position of the transmission electrode.

9. A capacitance type displacement detection apparatus having a transmission electrode group and a detection electrode group formed on one scale and capacity-coupled with a reception electrode formed on the other scale opposite to the one scale, said apparatus comprising:

a transmission signal line group for supplying signals to the transmission electrode group, said transmission signal line group having at least two transmission signal lines and disposed on a first wiring layer;

a detection signal line group for transferring signals from the detection electrode group, said detection signal line group having at least two detection signal lines and separately disposed on a second wiring layer different from the first wiring layer, the detection signal lines having a differential relationship and disposed at substantially equal distance from the transmission signal line group; and an electromagnetic shielding layer formed between the first wiring layer and the second wiring layer.

10. The capacitance type displacement detection apparatus as claimed in claim 9, wherein the detection signal line group is disposed on a plurality of wiring layers.

11. The capacitance type displacement detection apparatus as claimed in claim 10, wherein the detection signal lines having one differential relationship are disposed on one wiring layer and the detection signal lines having the other differential relationship are disposed on the other wiring layer.

12. The capacitance type displacement detection apparatus as claimed in claim 10, wherein the detection signal lines are respectively disposed on different wiring layers.

13. A capacitance type displacement detection apparatus having a transmission electrode group and a detection electrode formed on one scale and capacity-coupled with a reception electrode formed on the other scale opposite to the one scale, said apparatus comprising:

a transmission signal line group for supplying signals to the transmission electrode group, said transmission signal line group includiong at least two transmission signal lines having a differential relationship and disposed on a first wiring layer;

a detection signal line for transferring a signal from the detection electrode, said detection signal line separately disposed on a second wiring layer different from the first wiring layer at substantially equal distance from the transmission signal lines having the differential relationship; and an electromagnetic shielding layer formed between the first wiring layer and the second wiring layer.

\* \* \* \* \*